June 15, 1943.  G. H. KAEMMERLING  2,322,193
CUSHION
Filed Oct. 15, 1940  2 Sheets-Sheet 2
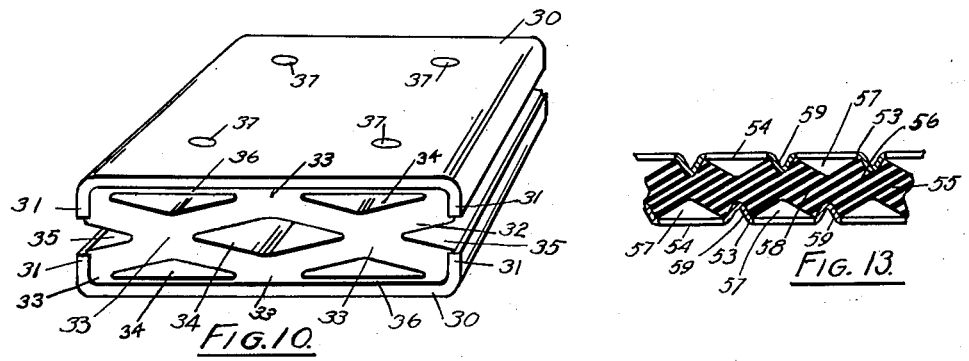
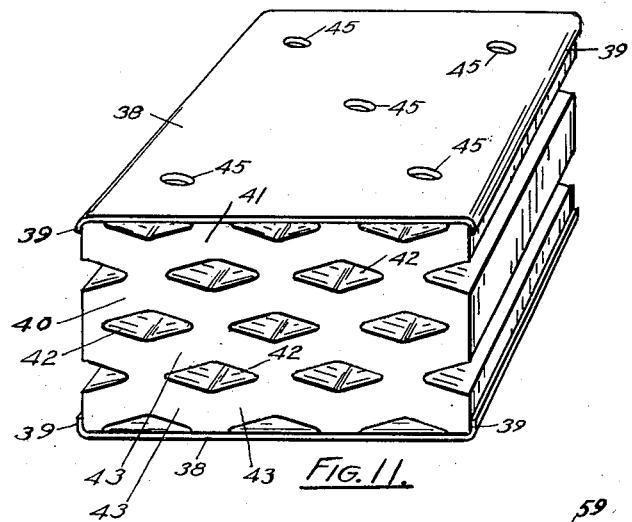
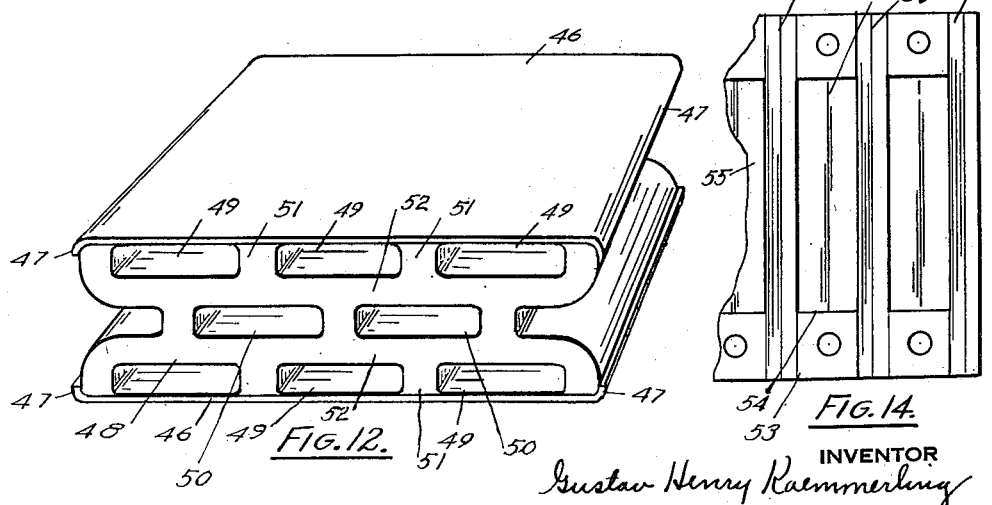
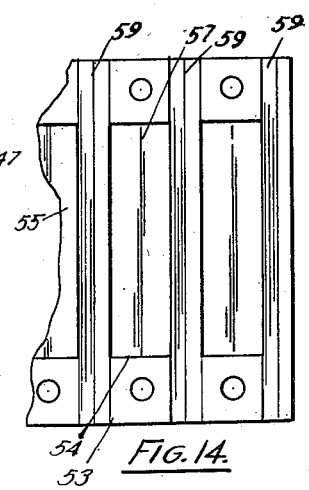

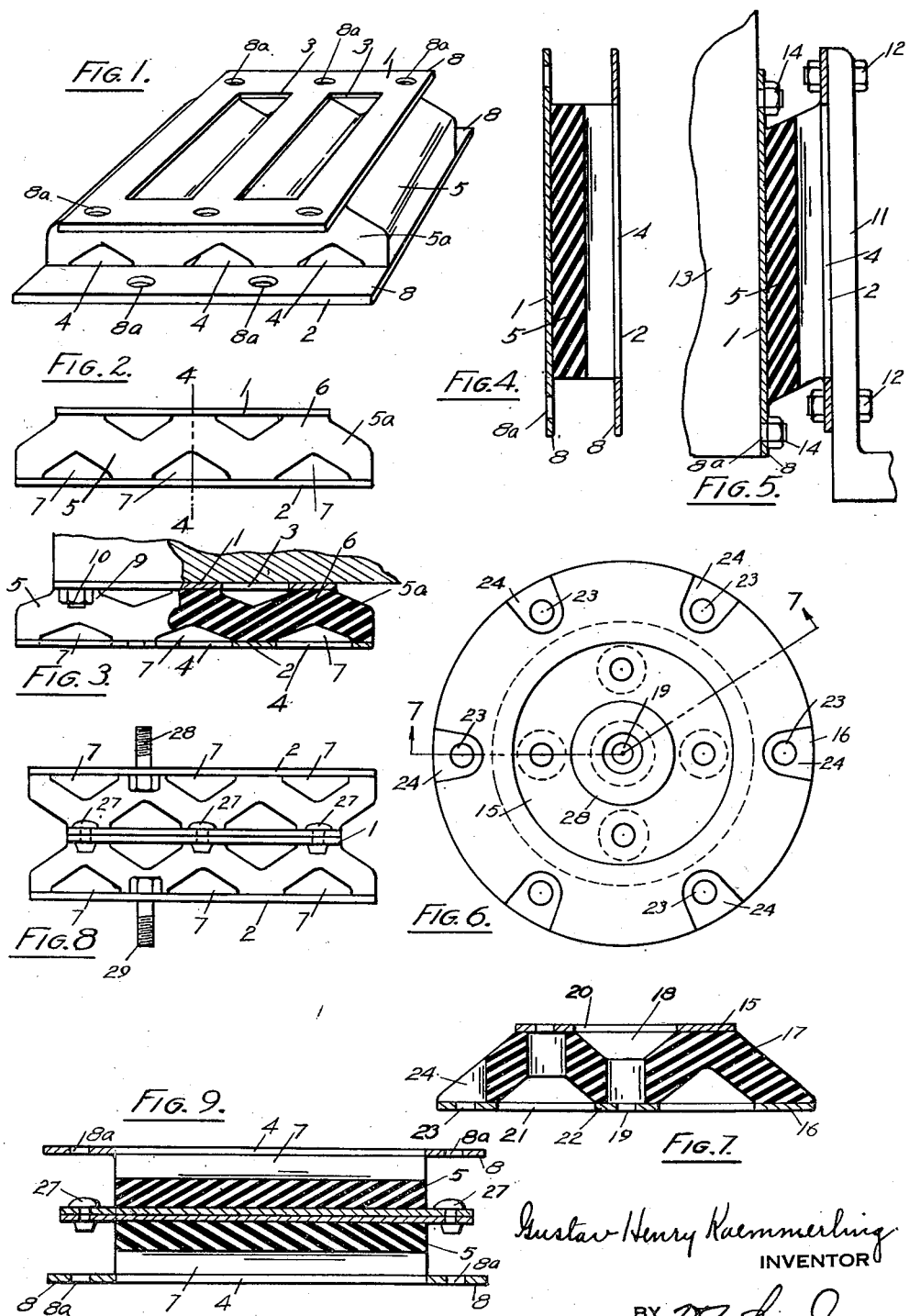

Patented June 15, 1943

2,322,193

UNITED STATES PATENT OFFICE 2,322,193

CUSHION

Gustav Henry Kaemmerling, Erie, Pa., assignor to Lord Manufacturing Company, Erie, Pa., a corporation of Pennsylvania Application October 15, 1940, Serial No. 361,273

11 Claims. (Cl. 248—358)

The present invention is to provide cushions for supporting articles subjected to shock or vibration, utilizing a resilient material such as rubber for the cushioning element.

Sandwich type mountings are used in compression perpendicular to the sandwich, or in shear parallel to the sandwich. In the first case, the mounting is very stiff, and permits of a comparatively small deflection within proper limits of stress. In the second case, the mounting is much softer and permits of a larger deflection. The permissible deflection in both cases is a function of the thickness of the sandwich. This is restricted by considerations of stability, and in the case of shear loading, by the rapid increase in bending with increased thickness, introducing undesirable tension and compression stresses in the upper and lower rubber surfaces, and subjecting the bond to a direct pull at right angles to the plate where the tension stress exists.

The present invention contemplates a sandwich which permits of adequate deflection by shear stress of the rubber when loaded perpendicular to the plates, largely increasing the permissible deflection for a given thickness of the sandwich, while retaining the advantage that the bond is in compression. It also permits a larger deflection when the load is applied in alignment with the plates, by holding the bending component of the deflection to a minimum, independent of the thickness, and also permits of a greater deflection for the same thickness of the sandwich. Also quite a wide variation can be made in the spring rate in one edgewise direction over another so that three definite deflection rates are provided that may be changed comparatively with relation to each other.

The invention also contemplates the provision of a rubber structure of the same type without the addition of bonded metal plates under conditions where the service demanded does not require the protective and attaching functions of the plates. Features and details of the invention will appear from the specification and claims.

A preferred embodiment of the invention is illustrated in the accompanying drawings as follows:

Fig. 1 shows a perspective view of the cushion.
Fig. 2 an end elevation of the cushion.
Fig. 3 a similar view partly in section.
Fig. 4 a section on the line 4—4.
Fig. 5 a section showing the cushion arranged vertically between a supported and supporting member.

Fig. 6 a cushion in annular form involving some of the characteristics of the rectangular form.
Fig. 7 a section on the line 7—7 in Fig. 6.
Fig. 8 an end elevation showing the union of a plurality of cushions similar to that shown in Fig. 1.
Fig. 9 a side elevation in section of the structure shown in Fig. 8.
Fig. 10 a perspective view of a modification in which there are a plurality of tiers of cushion structures similar to that of the resilient portion of the structure of Fig. 1.
Fig. 11 a perspective view of a structure in which the number of tiers of the cushion structure is increased.
Fig. 12 shows a modification in which the walls and opening are of rectangular formation.
Fig. 13 shows a cross section of a structure similar to Fig. 1 but with the plates ribbed.
Fig. 14 a plan view of the structure shown in Fig. 13.

Considering the structures of Figs. 1 to 5, 1 and 2 are side supporting plates. The plate 1 is provided with cross perforations 3, and the plate 2 with cross perforations 4, the perforations 4 of the plate 2 being arranged midway in a sidewise direction between the perforations 3.

A resilient element 5 of rubber or similar material is secured to the wall of the plate and is preferably secured to the plates by bonding during vulcanization. The resilient element has the supporting portions 6 which in this structure are bonded to the plates between the perforations. These supporting portions alternate from side to side, that is, from plate to plate. Alternate openings are arranged opposite the supporting portions and these are arranged alternately between the alternate supporting portions. The openings register with the perforations 3 and 4 and the walls of the openings are inclined forming inclined supporting walls 5a. The plates 1 and 2 have the securing portions 8 extending beyond the resilient element and these are preferably provided with perforations 8a to facilitate securing the plates to attached members connected by the cushion.

As shown in Fig. 3 the supported member 9 may be secured by bolts 10 or where the cushion is arranged vertically a supporting member 11 may be secured to one of the plates by bolts 12 and the supported member 13 secured to the opposite plate by bolts or screws 14.

It will be noted that in this structure when it is carrying a direct load at right angles to the sandwich structure, as in Fig. 3, the walls 5a support that load in shear and provide a very much softer cushion than is practical where the rubber fills the space. The walls 5a also provide shear portions where the mounting is arranged vertically and is arranged to receive the thrust lengthwise of the openings and walls 5a. The shear stress with a given deflection is less than the stress of rubber completely filling the space between the plates and thus a thinner cushion or mounting is possible with the same deflection stresses.

The plate perforations 3 and 4 facilitate the manufacture as the openings 7 can be readily formed by a mold part projecting through the perforations.

In Figs. 6 and 7 the general plan of structure is carried into a circular cushion having plates 15 and 16. The rubber element 17 has an annular form having access openings 18 in register with openings 19 in the plates. The plate 15 has an opening 20 in register with the opening 19, and the plate 16 has an enlarged opening 21 and a center plate 22. The plates have securing openings 23 and openings 24 in the rubber element in register with these openings to provide access, the openings 24 being opposite the openings in the plates.

In the structure shown in Figs. 8 and 9 cushion units, such as shown in Fig. 1, are secured together. In this way the cushions may be provided one above another to vary the deflection rate of the completed structure.

In the structure shown in Fig. 10 side plates 30 are provided. These plates preferably have flanges 31 at their edges. The resilient element 32 has supporting portions 33 which are alternately arranged as in Fig. 1, and have corresponding openings 34 opposite the supporting portions. In other words, there is a structure comprising two tiers of the sandwich structure of Fig. 1, the supporting portions of one tier being integrally united with the supporting portions of the superimposed tier. It will be noted that the united supporting portions 33 are much thicker than the inclined walls subjected to shear. Thus these walls have a substantial background controlling the shear action. Thus the uniting of the central openings completed have a diamond shape, whereas the side openings are half diamonds and the openings at the side edges form notches 35. Preferably the rubber element is carried across the openings next to the plates making a slight wall of rubber 36. This is desirable where the rubber element is united to the plates by bonding in that it simplifies the molding operation. The plates are provided with securing openings 37, these securing openings being opposite the openings 34. These may have tapped holes or receive studs.

In Fig. 11 the number of tiers is increased over that of Fig. 10. Here the plates 38 have side flanges 39. The rubber element 40 is provided with the supporting portions 41. Openings 42 are arranged opposite the supporting portions forming inclined intervening walls 43. Securing openings 45 are provided in the plates as in Fig. 10.

In Fig. 12 side plates 46 are provided with flanges 47. The resilient or rubber element 48 has rectangular openings 49 adjacent the plate extending the full length of the plates, rectangular openings centrally placed at 50, and supporting portions 51 united by walls 52. In this structure the load is carried largely in shear not only lengthwise of the supporting portion but crosswise thereof when carrying the load edgewise of the sandwich structure.

In Fig. 13 the structure is similar to that of Fig. 1 except that the metal of the plates between the slots is ribbed. This stiffens the plates. In the structure shown side plates 53 are provided. These have the slots 54 in offset relation in the two plates. The resilient element 55 has supporting portions 56 and openings 57, these openings being alternately arranged forming intervening walls 58, these parts operating substantially in the manner of the structure shown in Fig. 1. The plates are ribbed at 59 between the openings thus stiffening the plates. This is desirable, particularly if the plates are extended to any great extent. The ribs also form a more secure union at the bond between the plates and the element.

With these structures it will be understood they may be extended both sidewise and lengthwise and the deflection rates remain approximately constant in proportion to the area involved. This simplifies the selection of sizes to satisfy variations in loads and other conditions.

In carrying out the invention, particularly as exemplified, the rubber has what may be termed a lattice formation with alternate supporting ridges and opposite alternate openings.

It will also be noted that in this structure the rubber is so exposed in the vulcanizing process as to give a more satisfactory and uniform vulcanization in a shorter time than with other structures providing the same deflection range.

What I claim as new is:

1. The combination with rigid side plates, of an intervening cushion element of resilient incompressible material such as rubber having a plurality of united tiers, each tier having integral supporting ridge portions alternating from side to side, and openings opposite the supporting portion and alternating from side to side, placing intervening walls in shear, supporting portions of one tier being united with supporting portions of a superimposed tier, the resilient material of the tiers being integral, the openings extending through the material from edge to edge of the cushion.

2. The combination with rigid side plates of an intervening element of substantially incompressible resilient material, such as rubber, having a single tier of integral supporting ridge portions secured to the side-plates by a surface union, alternating from side to side, and openings opposite the supporting portions alternating from side to side placing the intervening walls in shear.

3. The combination with rigid side plates of an intervening element of substantially incompressible resilient material, such as solid rubber, having a single tier of integral supporting ridge portions secured to the side-plates by a surface union, alternating from side to side, and openings opposite the supporting portions alternating from side to side, the intervening walls being inclined.

4. The combination with opposing side plates having cross slots in offset relation in the opposing plates, an element of resilient material, such as rubber, secured between the plates having supporting ridge portions secured to the plates between the slots and openings opposite the supporting portions opening to the slots and alternating from side to side placing the intervening walls in shear.

5. The combination with side plates of an intervening element of resilient material, such as rubber, having supporting ridge portions secured to the side-plates, alternating from side to side, and openings opposite the supporting portions alternating from side to side placing the intervening walls in shear, the plates having securing extensions projecting beyond the element.

6. The combination with opposing side plates having cross slots in offset relation in the opposing plates, an element of resilient material, such as rubber, secured between the plates having supporting ridge portions secured to the plates between the slots and openings opposite the supporting portions opening to the slots and alternating from side to side placing the intervening walls in shear, the plates having securing extensions projecting beyond the element.

7. The combination with opposing side plates having cross slots in offset relation in the opposing plates, an element of resilient material, such as rubber, secured between the plates having supporting ridge portions secured to the plates between the slots and openings opposite the supporting portions opening to the slots and alternating from side to side placing the intervening walls in shear, the plates between the slots being ribbed.

8. In a mounting a member of substantially incompressible material, such as solid rubber or the like having load faces in spaced apart parallel planes and a plurality of voids in the member in parallel zones, the voids in each zone being spaced apart, the voids in one zone overlapping the voids in the next adjacent zone the overlap being at least equal to the area of the faces.

9. In a mounting of substantially incompressible material, such as solid rubber or the like having a body connected by a surface union at one end to and projecting directly from a support and at the other end connections to receive an offset load, the body providing support for the load through shear deflection of the body, the shortest path through the body between the load and support being longer than the shortest distance between the load and support.

10. A cushion of resilient substantially incompressible material, such as rubber, having a plurality of united tiers, each tier having integral supporting ridge portions alternating from side to side, and openings opposite the supporting portion and alternating from side to side, supporting portions of one tier being united with supporting portions of a superimposed tier, and means comprising rigid side plates for connecting a load to a support, and maintaining the opposite faces of the cushion in opposing planes whereby uniformity of load on the cushion may be maintained throughout by shear action.

11. A cushion of resilient substantially incompressible material, such as rubber, having a plurality of united tiers, each tier having integral supporting ridge portions alternating from side to side, and openings opposite the supporting portion and alternating from side to side, supporting portions of one tier being united with supporting portions of a superimposed tier, the united supporting portions being thicker than the intervening walls of the ridge portions, and means comprising rigid side plates for connecting a load to a support and maintaining the opposite faces of the cushion in opposing planes whereby uniformity of load on the cushion may be maintained throughout by shear action.

GUSTAV HENRY KAEMMERLING.